Patented May 20, 1947

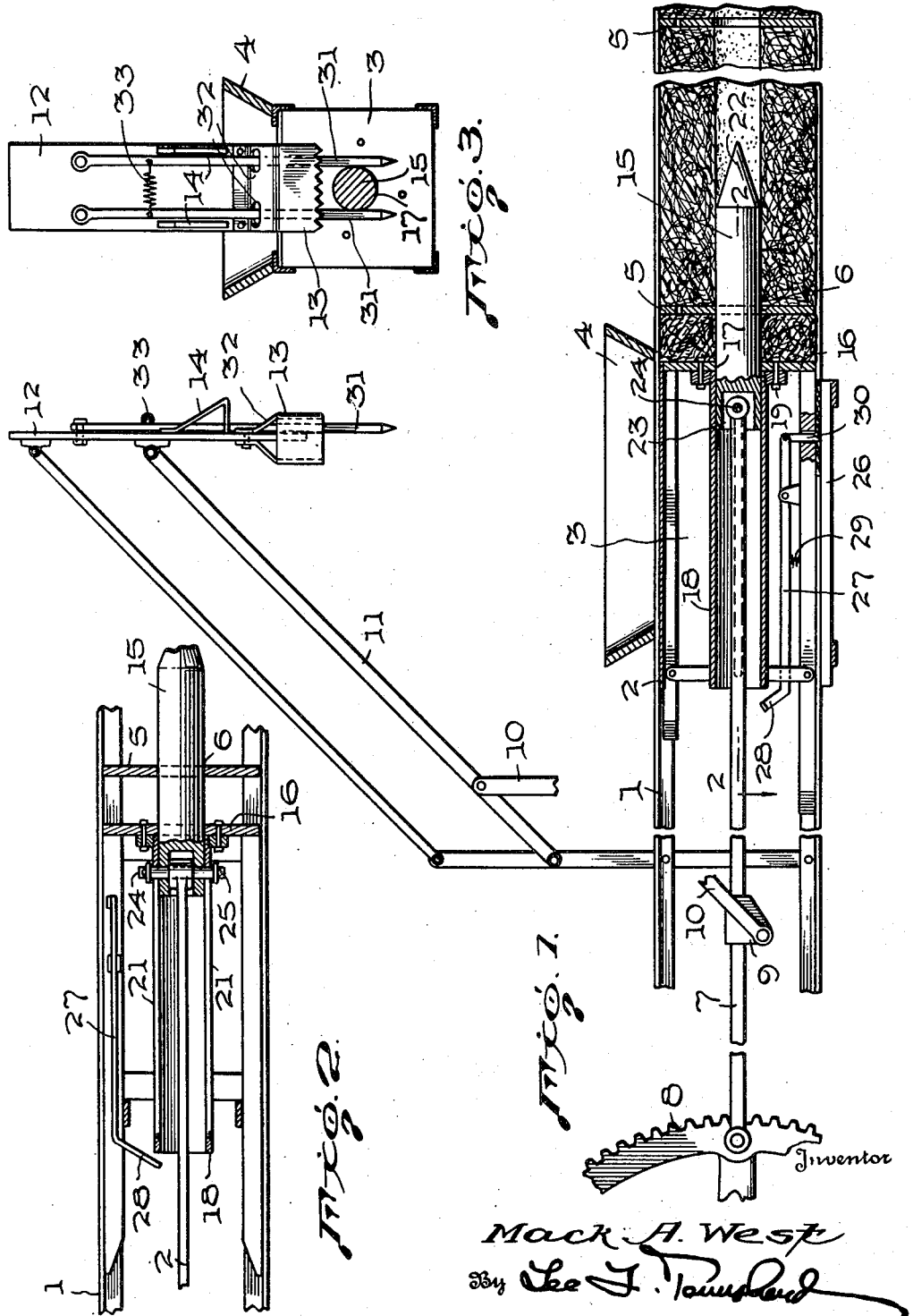

2,420,923

UNITED STATES PATENT OFFICE 2,420,923

HAY BALER FOR FORMING PERFORATED BALES

Mack A. West, Paragould, Ark.

Application December 2, 1943, Serial No. 512,625

15 Claims. (Cl. 100—19)

This invention relates to new and useful improvements in hay balers and the primary object of the invention is to provide a hay baler that forms a central hole or opening longitudinally through the bale. Bales of this character are not new and the advantage in providing a free circulation of air through the formed bale to assist in curing are appreciated but heretofore it has been difficult to properly form this type of bale during the normal baling operation. Prior mechanisms for this purpose have been cumbersome and impractical.

The foremost object of my invention is to provide a practical and economical mechanism for accomplishing this purpose which may be applied to a standard type of hay baler with but little change to the same.

Another object of my invention is to provide means for forming a hole in the bale during the normal cycle of a baling operation without affecting the cycle or result.

A further object of the invention is to provide a mechanism that will form a bale of hay with a central hole, that is just as strong and compact as a bale without such an opening.

Still a further object of the invention is to so arrange the hole forming plunger in conjunction with a conventional baler plunger that it is projected ahead of and withdrawn prior to the operation of the baler plunger so as to press the hay around the hole forming plunger and retain the hay being baled under pressure while the hole forming plunger is withdrawn which results in a clear firm hole formed during the successive stages of building up the bale.

Still a further object of the invention is to provide means, preferably carried by the feeder of a conventional baler, that prevents the loose hay from being forced in the hole as formed.

Other and further objects of the invention will be apparent from a detail description thereof, wherein only a preferred form of embodiment of the invention is shown and described, reference being had to the accompanying drawings, forming a part hereof, in which:

Figure 1 is a vertical section through a standard type of hay baler with my invention applied thereto. The parts are shown at the limit of the compression stroke and certain conventional operating parts are generally indicated partly broken away.

Figure 2 is a horizontal section on the line 2—2 of Figure 1.

Figure 3 is a vertical section through the baler chamber at right angles to Figure 1, showing the feeder head with attachment therein.

The baler illustrated is a standard and well known construction and comprises a main frame 1 through which the baler plunger 2 reciprocates, the initial stroke of the plunger being defined by approximately the length of the baling chamber 3, outlined by the hay inlet 4. The hay is compressed by successive movements of the baler plunger through the baling chamber and successive bales are formed in the opposite end of the frame, being separated by spacer blocks 5, each having a central opening 6 for a purpose to be hereinafter more fully described. The blocks are inserted in the end of the baler chamber by a conventional block setter, not shown.

The baler plunger 2 is reciprocated by a pitman 7 connected with the main drive gear 8, driven from any suitable source of power. The pitman is connected at 9 by a conventional linkage 10, partly broken away, to a conventional feeder having a frame 11 supporting on its forward end the conventional support 12 and head 13 with the usual block setter operator 14. These parts are conventional and form no part of my invention so some of the connections are shown partly broken way, as the use and operation are well understood. The only variation is that the length of the stroke of the pitman 7 is increased to permit successive operation of the hole forming plunger 15 with respect to the baler plunger 2 in a manner to be hereinafter described.

In the head 16 of the baler plunger 2, is an opening 17 and extending rearwardly from said head is a correspondingly sized guide tube 18 secured to the head by suitable fastening means 19. This tube is approximately the length of the baler plunger 2. The hole forming plunger 15 is adapted to slide through this tube. Diametrically opposed slots 21 extend longitudinally of the tube and terminate a short distance inwardly of the ends of said guide tube.

The hole forming plunger 15 is preferably solid and pointed as shown at 22 at its forward end. The rear end of the plunger 15 is recessed at 23 and passing therethrough is a wrist pin 24 on the front end of the pitman 7. The pin 24 extends from the wall of the plunger 15 and through the guide tube slots 21 and is prevented from longitudinal movement in assembled position by end stop means 25.

Extending longitudinally of the baler plunger 2 is a stationary rack 26 and carried by said plunger is a pivoted operating lever 27 having a bent end 28 adapted to be engaged by the rear end of the hole forming plunger 15 when said plunger is fully retracted. The lever is spring urged as shown at 29 and carries on its outer end a pivoted pawl 30 adapted to engage the teeth of the rack 26.

In the form of the invention illustrated a hay retarder is mounted upon the support 12 of the feeder mechanism and comprises a pair of pivoted fingers 31 that extend downwardly through enlarged openings 32 in the head 13 and project a suitable distance below said head. A compression spring 33, normally draws the fingers toward each other at their lower ends but permits them to expand to straddle the hole forming plunger 15, as clearly shown in Figure 3, for a purpose to be hereinafter more fully described.

In operation the parts are shown in Figure 1 with both the hole forming plunger and baler plunger fully extended and a partially formed new bale against the first block 5. The feeder is shown in elevated position. Part of the hole forming plunger projects through the partially formed bale, through an opening in the first block 5, and into the hole in the formed bale. The baler plunger is locked in its extended position by the spring urged lever carried pawl 30 engaging the rack 26.

Upon rearward movement of the pitman 7, the hole forming plunger 15 is drawn in the guide tube 18, the projecting ends of the pin 24 sliding along the slots 21. Just before the pin reaches the limit of its movement in the slots, the rear end of bale forming plunger 15 passes out of the tube 18 and engages the bent end 28 of the lever 27. This rocks the lever 27 and withdraws the locking pawl 30 from the rack permitting the baler plunger 2 to be retracted. When the ends of the pin 24 reach the ends of the slots 21, the pointed end 22 of the hole forming plunger 15 is withdrawn within the guide tube 18.

Continued rearward movement of the pitman 7, through the pin 24 engaging the ends of the slots 21 in the guide tube 18, will retract the unlocked baler plunger 2 to the limit of its rearward movement out of the baler chamber 3. At the same time, in the conventional manner, feeder head 13 will be moved down into the baler chamber. With the bale forming plunger retracted from the baler chamber, the ends of the pins 31 will be drawn toward each other and these pins are so arranged they are in alinement with the hole in the bale.

When the gear 8 moves the pitman 7 to the limit of its rearward movement and starts a return forward movement, the hole forming plunger 15 is projected or pushed through the baler chamber 3. The baler plunger 2 does not initially move as the ends of the pin 24 slide forwardly along the slots 21 of the guide tube 18 and no motion is transmitted to this latter plunger. The feeder has substantially filled the baler chamber 3 with loose hay and is still in position when the hole forming plunger 15 passes through said chamber. The head 13 as above the path of movement of said plunger but the fingers 31 are directly in said path of movement. The result is that no loose hay ahead of the plunger 15 is pushed into the previously formed hole. When the pointed end 22 of the plunger 15 strikes the fingers, they are spread against the tension of the spring 33 and straddle the plunger 15 as clearly shown in Figure 3.

Continued forward movement of the ends of the pin 24 in the slots 21 will bring the pin ends into engagement with the front end of the slots and a forward movement is then transmitted to the baler plunger 2 which will compress the hay in the baler chamber 3. Thus the baler plunger does not start its compression stroke until the hole forming plunger is fully projected and lies through the baler chamber 3 and is entering the previously formed hole in the partially formed bale. Of course further movement of the plunger 2 will move the plunger 15 through the partially formed bale and into the hole in the formed bale to a more or less extent according to the size of the partially formed bale.

When the rear end of the hole forming plunger 15 moves into the guide tube 18, then it releases the bent end 28 of the lever 27 and the pawl 30 is again under spring pressure. Upon forward movement of the baler plunger 2, it will slide over the teeth of the rack 26 but when this movement ceases, will engage the teeth to hold the plunger 2 under pressure against the hay being baled until released in the manner previously described.

My invention is characterized by the fact that through the cycle of the baling operation there is a successive projection of the hole forming plunger and the baler plunger through the baling chamber and then a successive withdrawal of the hole forming plunger within the baler plunger and withdrawal of the baler plunger from the baler chamber. Means are provided to automatically hold the baler plunger under pressure at the limit of its baling stroke until the hole forming plunger is retracted therein. Means are also provided shown in the illustration on the conventional feeder to prevent loose hay from being pushed into the preformed hole during initial projection of the hole forming plunger through the baler chamber. The fact the compression stroke of the baler plunger cooperates with the previously projected hole forming plunger assists in the forming and maintaining of the hole as the bale is being formed.

The advantages of forming a bale of hay or the like with a central opening extending the full length of the same are well known as it provides a free circulation of air that removes center dampness or heat and materially assists in the complete curing of the hay. The invention disclosed provides a practical mechanism for forming such an article that adapts itself for use on a standard hay baler with slight mechanical changes. The size and shape of the hole may be varied by merely changing the size and shape of the plunger 15 and cooperating parts. As the hay is compressed with the hole forming plunger in position, a clear cut hole is formed in the bale and as the hole forming plunger is withdrawn while the bale being formed is still under pressure, the formed hole is maintained in the same condition. This follows during the successive steps of forming a complete bale.

I claim:

1. In a hay baler, a baler plunger, a separately movable hole forming plunger slidably mounted therein, means to project the hole forming plunger before the start of the compression stroke of the baler plunger to form the bale around the same, the hole forming plunger being withdrawn by reverse movement of said means before the return stroke of the baler plunger, and means to hold the baler plunger under pressure until the hole forming plunger has been withdrawn within the same.

2. The combination of a hay baler having a baler plunger adapted to form a bale by successive strokes in the baler chamber and an automatic hay feeder intermittently operated between strokes, of a hole forming plunger carried by the baler plunger and operable in advance thereof, and means carried by the feeder to prevent entrance of loose hay into the hole in the bale being formed upon advance movement of the hole forming plunger.

3. The combination of a hay baler having a baler plunger adapted to form a bale by successive strokes in the baler chamber and an automatic hay feeder intermittently operated between strokes including a head adapted to enter the baler chamber, of a hole forming plunger carried by the baler plunger and operable in advance thereof, means carried by the feeder head to substantially cover the hole in the bale being formed and lying in the path of movement of the hole forming plunger, and said means being movable out of normal position upon engagement by the hole forming plunger.

4. The combination of a hay baler having a baler plunger adapted to form a bale by successive strokes in the baler chamber and an automatic hay feeder intermittently operated between strokes including a head adapted to enter the baler chamber, of a hole forming plunger carried by the baler plunger and operable in advance thereof, fingers carried by the feeder head to substantially cover the hole in the bale being formed and lying in the path of movement of the hole forming plunger, and said fingers being movable out of normal position upon engagement by the hole forming plunger.

5. The combination of a hay baler having a baler plunger adapted to form a bale by successive strokes in the baler chamber and an automatic hay feeder intermittently operated between strokes including a head adapted to enter the baler chamber, of a hole forming plunger carried by the baler plunger and operable in advance thereof, fingers carried by the feeder head to substantially cover the hole in the bale being formed and lying in the path of movement of the hole forming plunger, and said fingers being pivotally mounted and spring biased toward normal position whereby they may be moved aside when engaged by the hole forming plunger.

6. A hay baler including a baler plunger, a guide tube extending inwardly from an opening in the head thereof, a supplemental hole forming plunger mounted in said tube, and a single pitman cooperatively connected with both of said plungers.

7. A hay baler including a baler plunger, a guide tube extending inwardly from an opening in the head thereof, a supplemental hole forming plunger mounted in said tube, a wrist pin across the rear end of said hole forming plunger, a pitman connected with the wrist pin, said guide tube having opposed slots, and the ends of said wrist pin slidably mounted in said slots.

8. A hay baler including a baler plunger, a guide tube extending inwardly from an opening in the head thereof, a supplemental hole forming plunger mounted in said tube, a pitman, and means connecting the pitman and plungers whereby forward stroke of the pitman successively projects the hole forming plunger and baler plunger and return movement continues the same sequence in reverse.

9. A hay baler including a baler plunger, means to form a hole in a bale being formed by projecting a hole forming plunger therethrough and completing the compression stroke with both plungers moving as a unit, means for withdrawing the hole forming plunger before any return movement of the baler plunger, and means for holding the baler plunger under pressure until the hole forming plunger is drawn into the same.

10. A hay baler including a baler plunger, means to form a hole in a bale being formed by projecting a hole forming plunger therethrough and completing the compression stroke with both plungers moving as a unit, means for withdrawing the hole forming plunger before any return movement of the baler plunger, a stationary rack adjacent the baler plunger, a pivoted spring pressed pawl carried by the baler plunger engaging said rack to lock said plunger in position at the limit of its forward movement, and means to release said pawl from the rack when the hole forming plunger has been withdrawn in the baler plunger to permit return movement thereof.

11. A hay baler including a baling chamber, a baler plunger adapted to form a bale by successive strokes through the baling chamber, a hole forming plunger projected through the chamber ahead of the baler plunger before any corresponding movement thereof on each successive stroke, and hay retarding means normally positioned to prevent ingress of hay in the hole in the bale being formed during movement of the hole forming plunger through the baling chamber.

12. A hay baler including a baling chamber, a baler plunger adapted to form a bale by successive strokes through the baling chamber, a hole forming plunger projected through the chamber ahead of the baler plunger before any corresponding movement thereof on each successive stroke, and hay retarding means to prevent ingress of hay in the hole in the bale being formed lying in alinement with the direction of movement of the hole forming plunger during its passage through the baling chamber.

13. A hay baler including a baling chamber, a baler plunger adapted to form a bale by successive strokes through the baling chamber, a hole forming plunger projected through the chamber ahead of the baler plunger before any corresponding movement thereof on each successive stroke, hay retarding means normally positioned to prevent ingress of hay in the hole in the bale being formed during movement of the hole forming plunger through the baling chamber, and said means being movable out of normal position when the hole forming plunger enters the hole being formed.

14. A hay baler including a baling chamber, a baler plunger adapted to form a bale by successive strokes through the baling chamber, a hole forming plunger projected through the chamber ahead of the baler plunger before any corresponding movement thereof on each successive stroke, hay retarding means to prevent ingress of hay in the hole in the bale being formed normally lying in alinement with the direction of movement of the hole forming plunger during its passage through the baling chamber, and said means being movable out of normal position upon engagement by the hole forming plunger.

15. A hay baler including a baling chamber, a baler plunger adapted to form a bale by successive strokes through the baling chamber, a hole forming plunger projected through the chamber ahead of the baler plunger before any corresponding movement thereof on each successive stroke, fingers cooperating with the baling chamber to normally substantially block the ingress of hay in the hole in the bale being formed and lying in the path of movement of the hole forming plunger, and said fingers being movable out of normal position upon engagement by the hole forming plunger.

MACK A. WEST.

REFERENCES CITED

The following references are of record in the file of this patent:

UNITED STATES PATENTS

| Number | Name | Date |
|---|---|---|
| 860,284 | Deaton | July 16, 1907 |
| 960,796 | Bishop | June 7, 1910 |
| 970,930 | Kingham | Sept. 20, 1910 |
| 1,045,125 | Dain | Nov. 26, 1912 |